United States Patent Office 3,476,544
Patented Nov. 4, 1969

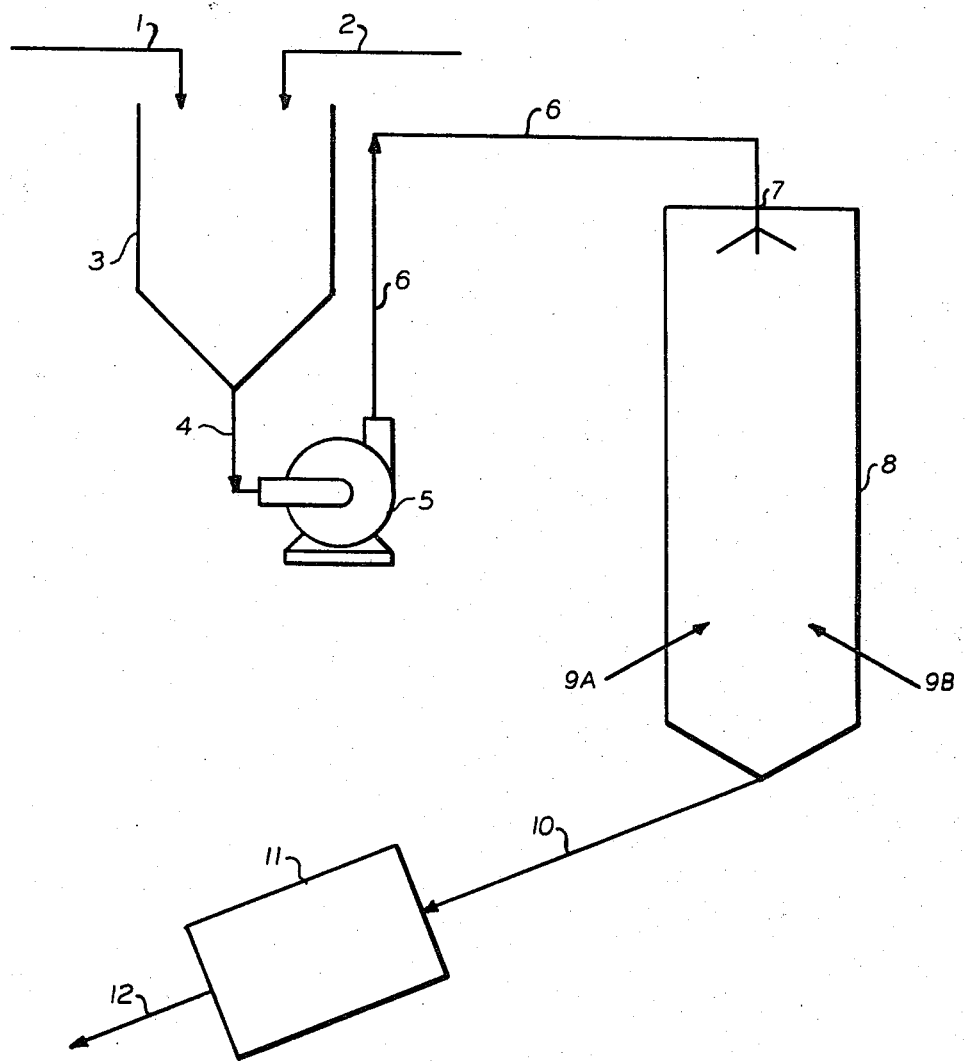
FIG. I.
INVENTOR
SRINI VASAN

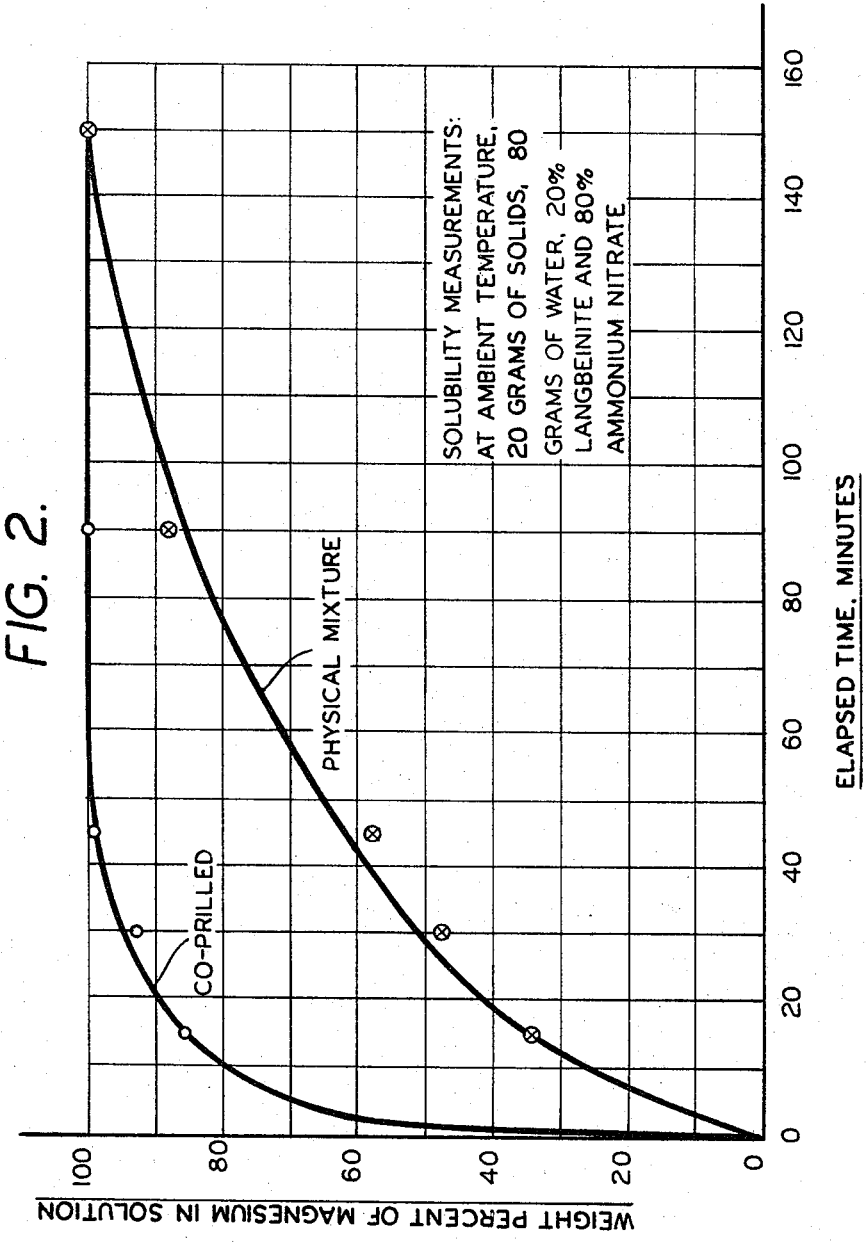

3,476,544
FERTILIZER PRILL CONSISTING OF AMMONIUM NITRATE AND LANGBEINITE AND THE METHOD OF PREPARING SAID PRILL
Srini Vasan, Glencoe, Ill., assignor to International Minerals and Chemical Corporation, Skokie, Ill.
Filed Apr. 12, 1967, Ser. No. 630,401
Int. Cl. C05c 1/00, 1/02
U.S. Cl. 71—59     4 Claims

ABSTRACT OF THE DISCLOSURE

This invention is a coprilling process for making a product comprising a minor amount of langbeinite and a major amount of ammonium nitrate.

---

This invention broadly contemplates production of a new product from mixtures of the naturally occurring magnesium and potassium sulfates and ammonium nitrate and, more particularly, is a coprilling process for making a solid, particulate product from mixtures of minor parts of langbeinite and major parts of ammonium nitrate.

It is an object of this invention to provide a relatively dustless, solid particular product containing langbeinite, with accelerated solubility characteristics.

It is another object of the invention to provide a process for manufacture of intimate mixtures of langbeinite and ammonium nitrate.

Another object is to provide a process for making an ammonium nitrate fertilizer product which is stable to heat and moisture and wehreby at least a portion of the conventional drying steps are eliminated, thereby effecting certain production cost economies.

A further object is to prepare an uncoated ammonium nitrate-containing solid product which does not undergo caking in ordinary atmospheric conditions.

A further object is to provide a solid, particulate, non-caking ammonium nitrate which contains the proportionate amounts of secondary fertilizer nutrients uniformly distributed throughout the solid fertilizer.

Other and further objects will become apparent from the more detailed description given therefor herein below.

Ammonium nitrate and ammonium-nitrate containing solid materials have long been known and used as fertilizers. In many instances, they have been incorporated with other materials, both those having fertilizer value and those having little or none. Also materials have been added thereto to prevent caking of the prilled product. It has also been found necessary to subject the ammonium nitrate to one or more pre-drying, drying, and coating steps in order to prepare a product capable of withstanding storage conditions of varying temperatures and humidity, and remain in the particulate conditions as stored.

The technique of prilling has been well known in the art of preparing particulated solids. It comprises a step in which the solid or melt is passed countercurrent in a tower to a stream of air. In the case of amomnium nitrate, it has been found that the so-called prilling tower must be a structure of the order of 200 feet, overall height, in order to be effective. The melt which is introduced into this tower is about 96–99% ammonium nitrate and about 1–4% water. After passing of this melt through the prilling tower the melt becomes solidified and hence it is necessary to subject the product to additional steps of predrying, drying and coating. Also, in order to prevent caking of the product, it has been found necessary to add at least about 3 weight percent of a non-caking agent to the prilled ammonium nitrate before storage.

It has now been found that the advantageous results of this invention are obtained using minor proportions (up to 50 weight percent) of the naturally occurring langbeinite $K_2SO_4 \cdot 2MgSO_4$ and major proportions (at least 50 weight percent) of ammonium nitrate. In order to provide a non-caking solid particulate ammonium nitrate, it has been found necessary to add at least about 7 weight percent of langbeinite. If it is necessary to reinforce the ammonium nitrate as a fertilizer with potassium and magnesium values, then from 10 to 50 weight percent of the langbeinite should be included in the coprilling process mixture. In fact this percentage yields the optimum quality fertilizer products.

It is not in any manner intended to limit the invention to any particular theory as to what occurs during the process disclosed herein. However, X-ray studies do not substantiate a basic change in constitution of the langbeinite and the ammonium nitrate. It is believed that a change in crystal structure occurs during the co-prilling process, although the two components appear to retain their entities.

It is considered to be outstanding and unusual that only the langbeinite $K_2SO_4 \cdot 2MgSO_4$ is effective when subjected to coprilling with the ammonium nitrate. For instance, if a physical mixture of langbeinite granules and $NH_4NO_3$ prills is employed, the outstanding results as to product advantages are not obtained. That is, the good stability of the particles, and the greatly increased rate of solubility in water is not achieved.

It is furthermore somewhat surprising that the preferred mixtures of ammonium nitrate and langbeinite, after co-prilling in accord with this invention do not show sensitivity as explosives. In view of the explosive characteristics of ammonium nitrate, it is believe to be most unusual that this product containing a major portion of ammonium nitrate shows little or no explosive tendencies.

There are numerous advantages achieved by the process described and claimed herein and by the novel co-prilling product produced thereby.

Among the advantages is that at least one or both of the drying steps is eliminated for the ammonium nitrate product. This results in significant economic advantages in production technology of the product.

Another advantage is accomplished by the fact that the langbeinite has much increased rate of solubility when it has undergone the coprilling step with major proportions of ammonium nitrate admixed therewith. This unexpected increase rate of solubility is shown by the data presented herein below.

It is not necessary to add an extraneous inert anti-caking agent such as kaolin or the like when the ammonium nitrate is coprilled with langbeinite, the mixed product being a free-flowing, solid particulate product.

It has been found that the coprilled product of langbeinite and ammonium nitrate mixtures has a relatively high bulk density which is of great advantage in its end use as fertilizer.

It is a further advantage to be able to utilize the langbeinite "fines" as an additive to the ammonium nitrate to undergo coprilling.

EXAMPLE 1

FIGURE 1 represents a diagrammatic sketch of the process of this invention to produce the novel fertilizer product.

A mixture of about 20 percent by weight of langbeinite and about 80 percent by weight of ammonium nitrate is made up in mixing tank 3. Inlet lines 1 and 2 are used for introducing the solid or melt materials into the tank 3. This physical mixture of solids or melt is then passed via lines 4 and 6, via pump 5 to prilling tower 8. It is necessary that the mixture be in a melt condition at the time it is introduced into tower 8 via inlet 7. The temperature of the melt is about 250–350° F. The height of the tower 8 can vary, but it should be of sufficient dimension to solidify the melt and to produce granular or round solid-particles at the bottom or outlet of the tower. A product at the bottom of the tower is controlled to within the range of 140–200° F. Air is introduced into tower 8 at the lower portion of bottom of the tower preferably at multiple inlets 9A and 9B. The solidified, particulated, co-prilled product is collected at the bottom of the tower 8 via outlet 10, or preferably via a belt 10 and passed into cooler drum 11. The product is recovered from drum 11 via pipe or belt 12. A drying step may be introduced, if necessary.

After or during the production of the coprilled product, other fertilizer ingredient either in the melt phase or otherwise, and herbicides can be incorporated therein as well as various plant nutrient materials.

EXAMPLE 2

Two samples of langbeinite ammonium nitrate mixtures were tested for solubility as follows. A mixture of 20% by weight of langbeinite and 80% by weight ammonium nitrate was subjected to coprilling in accord with the process of the invention as set forth herein above.

A physical mixture of the langbeinite and ammonium nitrate was made up in the same relative proportions. Samples of each of these two mixtures were made up in the proportions of 20 g. of mixture and 80 g. of water. These two sets of samples were analyzed at time intervals. The results determined at ambient temperatures are shown in the table set forth below as well as in the curves of FIGURE 2 which were plotted therefrom.

TABLE

| | Coprilled Product | Percent Mg in Solution in Filtratn Physica Mixture |
|---|---|---|
| Time Interval, Min. Elapsed: | | |
| 15 | 86 | 35 |
| 30 | 93 | 48 |
| 45 | 99.9 | 58 |
| 90 | 100 | 88 |
| 150 | 100 | 100 |

The above results show the striking contrast in rate of solubility between the coprilled product and the physical mixture, both containing the ammonium nitrate and the langbeinite components in the same proportions.

All parts herein mentioned are by weight unless otherwise indicated.

What is claimed is:

1. A coprilled, solid, particulate product consisting essentially of a major proportion of ammonium nitrate and at least 7% of langbeinite, $K_2SO_4 \cdot 2MgSO_4$.

2. The product of claim 1 having from 10 up to 50% langbeinite.

3. The process of preparing an improved coprilled product of ammonium nitrate and langbeinite which comprises the steps of preparing a melt of a major proportion of ammonium nitrate and at least 7% of langbeinite and coprilling said melt counter-current to a current of air at temperatures of up to 200° F., whereby a non-caking solid, storable, coprilled product having accelerated solubility is obtained.

4. The process of claim 3 in which the melt is at a temperature above 200° F.

References Cited

UNITED STATES PATENTS 2,782,108 2/1957 Antle.
3,282,674 11/1966 Mohr.

OTHER REFERENCES

Sauchelli, U., Chemistry and Technology of Fertilizers, N.Y., Reinhold, 1960, Chapter 17, Section 2, p. 450 by R. S. Boynton, Calcium and Magnesium in Mixed Fertilizers.

S. LEON BASHORE, Primary Examiner

R. D. BAJEFSKY, Assistant Examiner

U.S. Cl. X.R.

71—60, 64; 23—103; 252—385